US008903961B2

(12) United States Patent
O'Sullivan et al.

(10) Patent No.: US 8,903,961 B2
(45) Date of Patent: *Dec. 2, 2014

(54) METHOD AND SYSTEM FOR COMMUNICATION SESSIONS

(71) Applicant: International Business Machines Corporation, Armonk, NY (US)

(72) Inventors: Patrick Joseph O'Sullivan, Ballsbridge (IE); Sean Callanan, Churchtown (IE); Ruthie D. Lyle, Durham, NC (US); Fred Raguillat, Meath (IE); Carol Sue Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/628,250

(22) Filed: Sep. 27, 2012

(65) Prior Publication Data

US 2013/0021907 A1    Jan. 24, 2013

Related U.S. Application Data

(63) Continuation of application No. 12/648,622, filed on Dec. 29, 2009, now Pat. No. 8,307,052.

(51) Int. Cl.
| | | |
|---|---|---|
| G06F 15/16 | (2006.01) | |
| H04L 12/24 | (2006.01) | |
| H04L 29/06 | (2006.01) | |
| H04L 29/08 | (2006.01) | |

(52) U.S. Cl.
CPC ............. *H04L 41/5067* (2013.01); *H04L 29/06* (2013.01); *H04L 29/08072* (2013.01); *H04L 41/5009* (2013.01)

USPC ............ 709/220; 709/224; 709/226; 709/232

(58) Field of Classification Search
CPC .......................... H04L 29/08072; H04L 29/06
USPC .................................. 709/220, 224, 226, 232
See application file for complete search history.

(56) References Cited

U.S. PATENT DOCUMENTS

| | | |
|---|---|---|
| 6,587,876 B1 | 7/2003 | Mahon et al. |
| 6,789,116 B1 | 9/2004 | Sarkissian et al. |
| 6,822,940 B1 | 11/2004 | Zavalkovsky et al. |
| 6,954,789 B2 | 10/2005 | Dietz et al. |
| 7,065,494 B1 | 6/2006 | Evans |

(Continued)

OTHER PUBLICATIONS

Morse, Bruce, "Avistar C3 Command", article, 2 pages, Avistar Communications Corporation, www.avistar.com.

*Primary Examiner* — Khanh Dinh
(74) *Attorney, Agent, or Firm* — Holland & Knight LLP; Brian J. Colandreo, Esq.; Jeffrey T. Placker, Esq.

(57) ABSTRACT

A method and computer program product includes calculating a score for one or more communication sessions on a communication device, associating the score with the one or more communication sessions, and measuring a performance metric on the communication device. The performance metric may be indicative of a load on the communication device, and may be caused, at least in part, by the one or more communication sessions. If the performance metric on the communication device falls outside an acceptable value, a number of participants in at least one of the one or more communication sessions may be reduced based on the score associated with the at least one of the one or more communication sessions.

20 Claims, 3 Drawing Sheets

(56) References Cited

U.S. PATENT DOCUMENTS

| | | |
|---|---|---|
| 7,299,282 B2 | 11/2007 | Sarkissian et al. |
| 8,325,215 B2 * | 12/2012 | Ristock et al. ............. 348/14.08 |
| 2003/0110252 A1 | 6/2003 | Yang-Huffman |
| 2007/0160054 A1 | 7/2007 | Shaffer et al. |
| 2008/0045284 A1 | 2/2008 | Assaad et al. |
| 2008/0126568 A1 | 5/2008 | Otoshi et al. |
| 2010/0165887 A1 | 7/2010 | Ristock et al. |
| 2010/0169265 A1 * | 7/2010 | Ristock et al. ................. 706/52 |
| 2010/0169499 A1 * | 7/2010 | Ristock et al. ................ 709/229 |
| 2010/0287281 A1 * | 11/2010 | Tirpak ......................... 709/226 |

* cited by examiner

METHOD AND SYSTEM FOR COMMUNICATION SESSIONS

RELATED APPLICATIONS

The subject application is a continuation application of U.S. patent application with Ser. No. 12/648,622, filed on Dec. 29, 2009, the entire content of which is herein incorporated by reference.

BACKGROUND OF THE INVENTION

This disclosure relates to electronic communication and, more particularly, to electronic communication sessions.

Online meetings have become a popular method of communicating. More and more live meetings are occurring over networks such as the internet. For example, voice over IP is a popular way for users to participate in conference calls. Video chats are common where geographically distant parties want to communication face-to-face in real-time. Technologies such as Sametime® unified telephony allow different telephony devices to interact via a common application server infrastructure. (Sametime is a registered trademark of International Business Machines Corporation in the United States, other countries, or both).

Problems can arise when a load on a server providing online meetings becomes too large. When the load becomes too large, the server may instantly disconnect meetings, may provide poor performance, and may even crash, thus creating an online meeting outage. These outages can frustrate meeting participants, and can result in lost time and productivity. Avoiding or alleviating a large load on a server may provide benefits to meeting participants.

BRIEF SUMMARY OF THE INVENTION

In an embodiment, a method includes calculating a score for one or more communication sessions on a communication device, associating the score with the one or more communication sessions, and measuring a performance metric on the communication device. The performance metric may be indicative of a load on the communication device, and may be caused, at least in part, by the one or more communication sessions. If the performance metric on the communication device falls outside an acceptable value, a number of participants in at least one of the one or more communication sessions may be reduced based on the score associated with the at least one of the one or more communication sessions.

One or more of the following features may be included. Reducing the number of participants in a communication session may include terminating the communication session. A terminated communication session may be reestablished if the performance metric on the communication device falls within the acceptable value.

Thee score may be calculated based, at least in part, upon a total number of participants in the communication sessions. The score may also be calculated based, at least in part, upon an organizational position of one or more participants in the communication sessions.

Reducing the number of participants in the communication sessions may be further based, at least in part, upon a length of time the one or more communication sessions has been active. Reducing the number of participants in the communication sessions may also include reducing the number of participants only if none of the participants has a predetermined organizational position.

One or more of the participants in the at least one of the one or more communication sessions may be notified before reducing the number of participants.

Calculating the score may include reading information from an LDAP directory and calculating the score based upon the information from the LDAP directory; and reading information from a social networking directory and calculating the score based upon the information from the social networking directory.

The communication sessions may include telephonic communication sessions; video communication sessions; instant messaging communication sessions; and email communication sessions.

In another embodiment, a computer program product resides on a computer readable storage device. The computer program product includes a plurality of instructions, which, when executed by a processor, cause the processor to perform operations including calculating a score for one or more communication sessions on a communication device, associating the score with the one or more communication sessions, and measuring a performance metric on the communication device. The performance metric may be indicative of a load on the communication device, and may be caused, at least in part, by the one or more communication sessions. If the performance metric on the communication device falls outside an acceptable value, a number of participants in at least one of the one or more communication sessions may be reduced based on the score associated with the at least one of the one or more communication sessions.

One or more of the following features may be included. Reducing the number of participants in a communication session may include terminating the communication session. A terminated communication session may be reestablished if the performance metric on the communication device falls within the acceptable value.

Thee score may be calculated based, at least in part, upon a total number of participants in the communication sessions. The score may also be calculated based, at least in part, upon an organizational position of one or more participants in the communication sessions.

Reducing the number of participants in the communication sessions may be further based, at least in part, upon a length of time the one or more communication sessions has been active. Reducing the number of participants in the communication sessions may also include reducing the number of participants only if none of the participants has a predetermined organizational position.

One or more of the participants in the at least one of the one or more communication sessions may be notified before reducing the number of participants.

Calculating the score may include reading information from an LDAP directory and calculating the score based upon the information from the LDAP directory; and reading information from a social networking directory and calculating the score based upon the information from the social networking directory.

The communication sessions may include telephonic communication sessions; video communication sessions; instant messaging communication sessions; and email communication sessions.

BRIEF DESCRIPTION OF THE SEVERAL VIEWS OF THE DRAWINGS

In the figures, like reference designators may denote like elements.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in baseband or as part of a carrier wave. Such a propagated signal may take any of a variety of forms, including, but not limited to, electro-magnetic, optical, or any suitable combination thereof, a computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present invention may be written in an object oriented programming language such as the Java® language, Smalltalk, C++ or the like. (Java and all Java-based trademarks and logos are trademarks of Sun Microsystems, Inc. in the United States, other countries, or both). However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory and/or computer readable storage medium that can direct a computer or other programmable data processing apparatus to function in a particular manner, such that the instructions stored in the computer-readable memory and/or computer readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
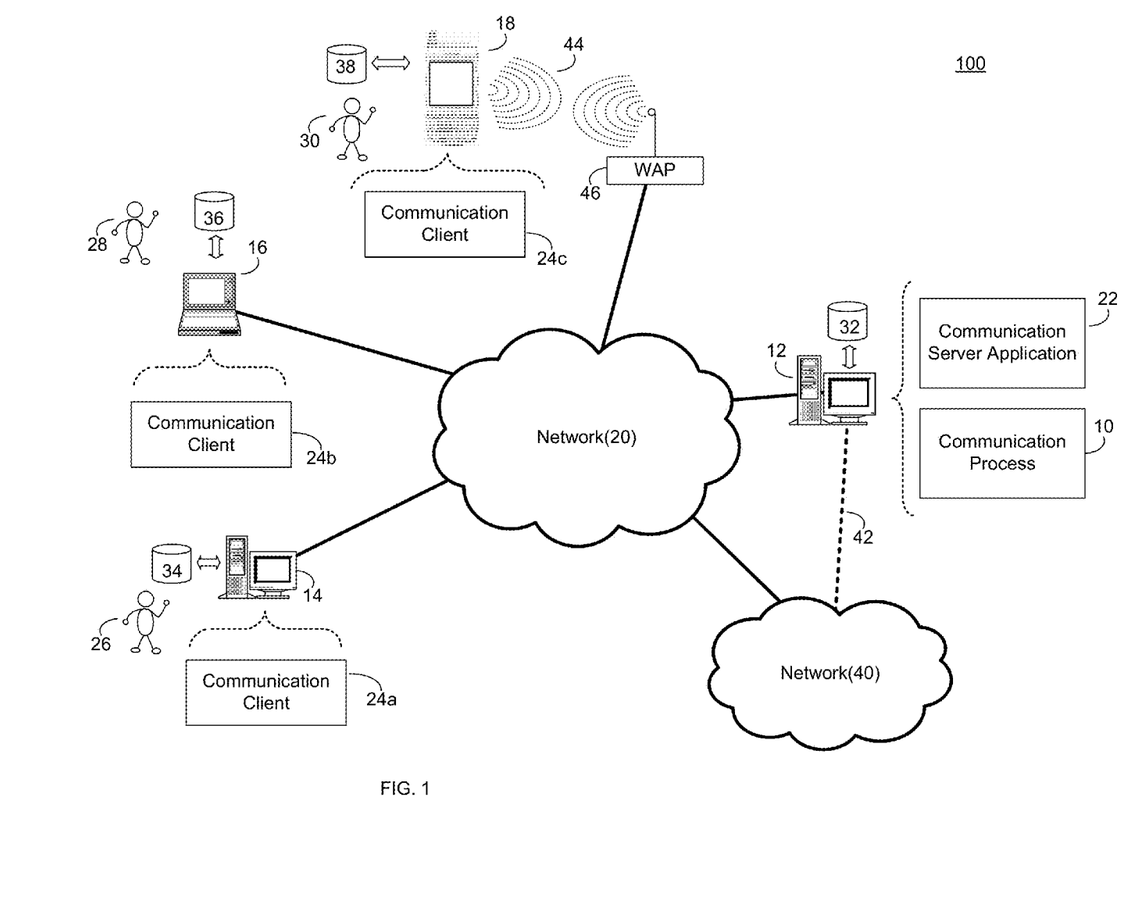
FIG. 1 is diagrammatic view of a system architecture within which a communication process may reside.

FIG. 1 depicts computing infrastructure 100 within which communication process 10 may reside. As shown, communication process 10 may reside on and may be executed by computer 12. Although not shown, communication process 10 may also reside on and may be executed by computer 14, laptop 16, personal digital assistant ("PDA") 18, or any other computing device capable of executing communication process 10. The various computing devices, including computers 12, 14, laptop 16, and/or PDA 18, may each be directly or indirectly connected to network 20 (e.g., the Internet or a local area network).

Computer 12 may be a server device. Computer 14, laptop 16, and PDA 18 may be end user devices. Computers 12, 14, laptop 16, and PDA 18 may run network operating systems, examples of which may include but are not limited to: Microsoft Windows XP® Server; Novell® Netware®; or Redhat® Linux®, for example (Windows XP is a registered trademark of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both).

Computer 12 may be a server computer, such as a web server, blog server, email server, instant messaging server, telephony server, video conference server, or other server that provides communication services to end users, for example. Computer 12 may execute various server applications, which may include a web server, a file server, a file transfer protocol server, or any other kind of server application. Examples of computer 12 may include, but are not limited to: a personal computer, a server computer, a series of server or personal computers, a mini computer, and a mainframe computer, for example.

Computer 12 may execute communication server application 22, which may be an application configured to provide communication services to users 26, 28, 30, for example. Communication server application 22 may be a telephony server application that provides audio communication services, a video conferencing application that provides video conferencing services, an instant messaging application, an email application, a chat application, an IRC application, or any other application that provides communication services between users, such as users 26, 28, 30.

FIG. 1 also depicts communication clients 24a, 24b, 24c, which may reside on and may be executed by any appropriate computing device, including, but not limited to, computers 12, 14, laptop 16, and/or PDA 18. Communication clients 24a, 24b, 24c may be any type of communication client software applications. For example, communication clients 24a, 24b, 24c may be video conferencing applications, telephony/VoIP applications, email applications, instant messaging applications, and the like. Continuing the example, communication clients 24a, 24b, 24c may allow users 26, 28, 30 to communicate with each other via communication server application 22. For example, user 26 may use communication client 24a to begin a voice conference session. Communication client 24a may communicate with communication server application 22, which may provide voice conferencing services. Communication server application 22 may initiate a voice conference and allow user 26, user 28, and user 30 to use communication client 24a, communication client 24b, and communication client 24c, respectively, to connect to communication server application 22. Once connected, users 26, 28, 30 may communicate with each other via the voice conferencing session between communication server 22 and/or communication clients 24a, 24b, 24c.

As will be discussed below in greater detail, communication process 10 may calculate a score for one or more communication sessions on a communication device, such as computers 12, 14, laptop 16, and/or PDA 18. Communication process 10 may associate the score with the one or more communication sessions, and may measure a performance metric on the communication device. The performance metric may be indicative of a load on the communication device, which may be caused, at least in part, by the one or more communication sessions. If the performance metric on the communication device falls outside an acceptable value, communication process 10 may reduce a number of participants in the communication sessions based on the score associated with the communication sessions.

The instruction sets and subroutines of communication process 10, which may include one or more software modules and one or more sets of software instructions, may be stored on storage device 32 coupled to computer 12. The instruction sets and subroutines of communication clients 24a, 24b, 24c may be stored on storage device 34 coupled to computer 14, storage device 36 coupled to laptop 16, and storage device 38 coupled to PDA 18, respectively. Communication process 10 may be executed by one or more processors and one or more memory architectures incorporated into the various electronic devices. Examples of storage devices 32, 34, 36, 38 may include but are not limited to: hard disk drives; solid state drives; tape drives; optical drives; RAID arrays; random access memory (RAM); read-only memory (ROM); and the like.

The instruction sets and subroutines of communication process 10 may be generated through the use of a compiler, such as the IBM XL compiler, the Visual Studio® compiler, or an assembler, for example (Visual Studio is a registered trademark of Microsoft Corporation in the United States, other countries, or both). The instruction set and subroutines may also be generated as scripts, such as JavaScript® scripts, or as other types of software code (Java and all Java-based trademarks and logos are trademarks of Sun Microsystems, Inc. in the United States, other countries, or both). In general, and as is known in the art, the instruction sets and subroutines of communication process 10 may be generated via any method of generating instruction sets and subroutines that may be executed by a processor.

As mentioned, various client electronic devices may be coupled to network 20. Examples of client electronic devices may include, but are not limited to: computer 12, computer 14, laptop 16, PDA 18, a game console (not shown), cellular telephone (not shown), and a dedicated network device (not shown). One or more users (e.g., users 26, 28, 30) may access the various tools and applications, such as communication process 10, communication server application 22, and/or communication client 24a, 24b, 24c, from any device connected to network 20 or directly from the device on which the tool or application resides.

Various computer devices and/or client electronic devices may be coupled directly to network 20, or may be indirectly coupled to network 20 through network 40. For example, computer 12 is shown directly connected to network 20. However, computer 12 may also be indirectly connected to network 20 through secondary network 40, as illustrated by phantom link line 42.

The various client electronic devices may be directly, indirectly, and/or wirelessly coupled to network 20 (or network 40). For example, computers 12, 14, and laptop 16 are shown directly coupled to network 20 via hardwired network connections. PDA 18 is shown wirelessly coupled to network 20 via wireless communication channel 44 established between PDA 18 and wireless access point (i.e., WAP) 46, which is shown directly coupled to network 20. WAP 48 may be, for example, an IEEE 802.11a, 802.11b, 802.11g, Wi-Fi, cellular, and/or Bluetooth device that is capable of establishing wireless communication channel 46 between PDA 18 and WAP 46.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 2:
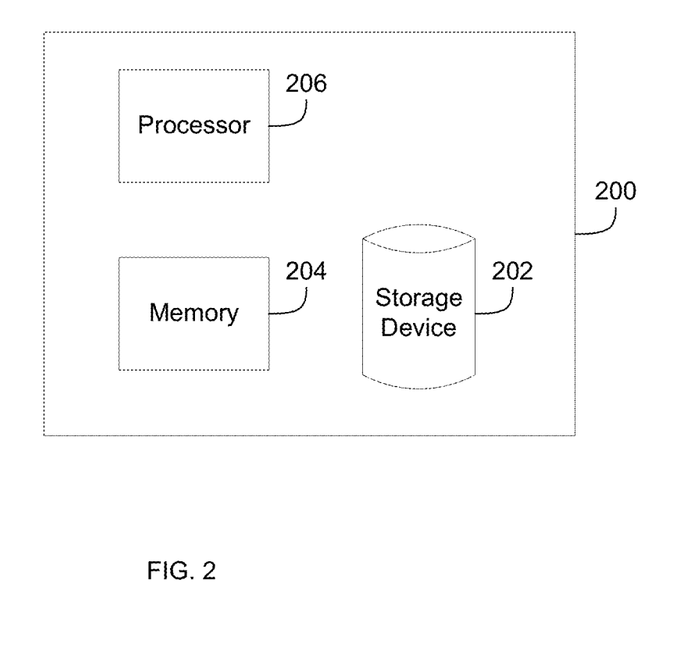
FIG. 2 is a block diagram of a computing device.

FIG. 2 shows a block diagram of computing device 200. Computing device 200 may be any computing device capable of executing communication process 10, communication server application 22 and/or communication clients 24a, 24b, 24c. Computing device 200 may include storage device 202. Storage device 202 may be a hard drive, DVD drive, CD drive, Flash memory, RAID array, or any other computer readable storage device. Computing device 200 may also include memory 204. Memory 204 may be a single memory or a series of memories. Memory 204 may be a memory device including, but not limited to, a read only memory (ROM), a random access memory (RAM), a flash memory, an EEPROM, or any other type of computer readable memory. The instruction sets and subroutines of communication process 10, communication server application 22, and/or communication clients 24a, 24b, 24c may be stored in memory 204 and/or storage device 202, for example.

Computing device 200 may also include processor 206. Processor 206 may be a single processor or a series of processors. Processor 206 may be a general purpose processor, or a specialized processor. In general, processor 206 may be any processor capable of executing software and/or software instructions. Processor 206 may be coupled to memory 204 and/or storage device 202 and may read and execute software instructions and routines stored on memory 204 and/or storage device 202. When processor 206 executes the instruction sets and subroutines of communication process 10, communication server application 22 and/or communication clients 24a, 24b, 24c, the instructions and subroutines may cause processor 206 to perform various operations, which will be discussed below in greater detail.

One skilled in the art will recognize that computing device 200 may also include various other parts and devices that may facilitate computing operations. For example, computing device 200 may include a north bridge chip, a south bridge chip, a memory bus, an IDE or SATA bus, and various input and output buses and devices, such as a USB bus, a network interface, a mouse, a keyboard, and/or a monitor. In general, computing device 200 may be any computing device, with any computing architecture, capable of executing communication process 10, communication server application 22 and/or communication clients 24a, 24b, 24c.

Figure 3:
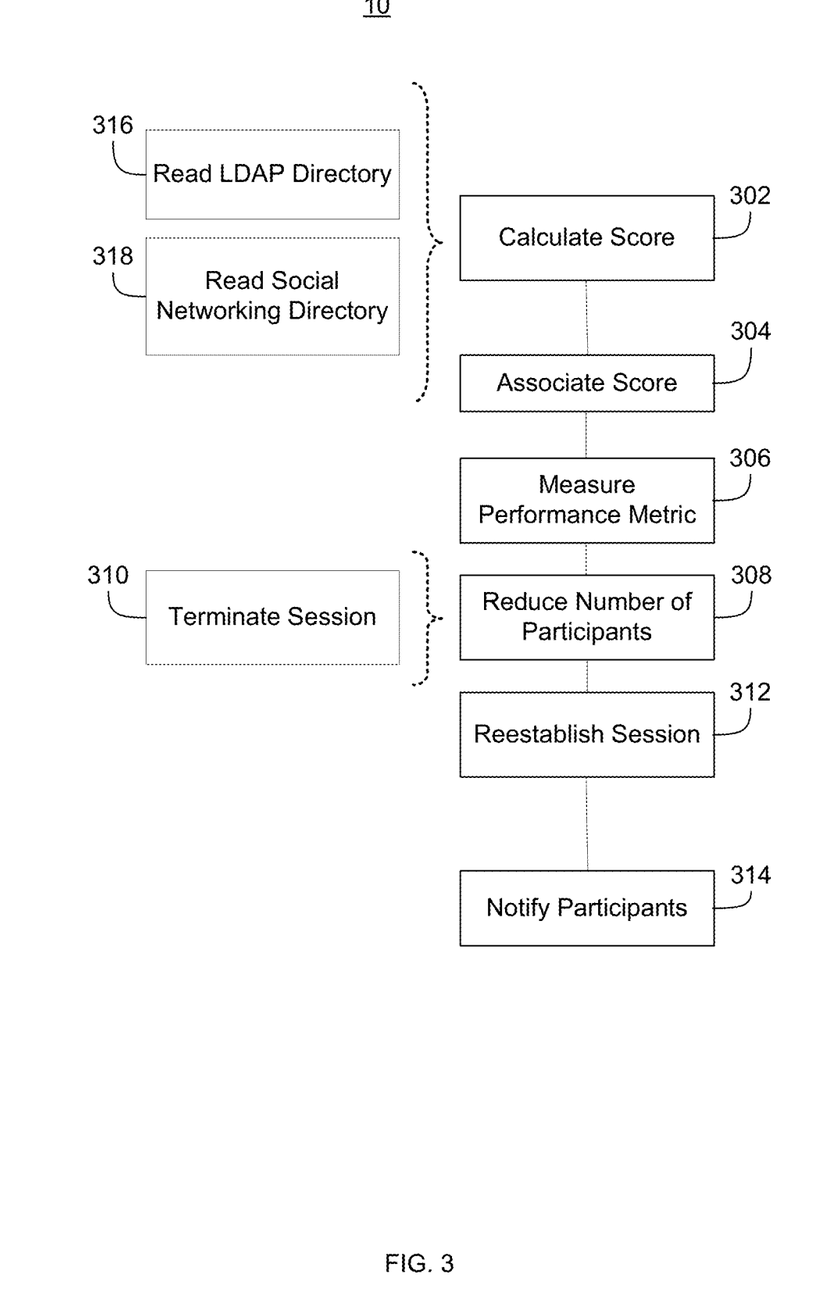
FIG. 3 is a flowchart diagram of a communication process.

FIG. 3 depicts a flowchart that includes various operations associated with communication process 10. As shown, communication process 10 may calculate 302 a score for one or more communication sessions on a communication device, such as computers 12, 14, laptop 16, and/or PDA 18. Communication process 10 may associate 304 the score with the one or more communication sessions, and may measure 306 a performance metric on the communication device. The performance metric may be indicative of a load on the communication device, which may be caused, at least in part, by the one or more communication sessions. If the performance metric on the communication device falls outside an acceptable value, communication process 10 may reduce 308 a number of participants in the communication sessions based on the score associated with the communication sessions. In some cases, reducing the number of participants in the communication sessions may include terminating 310 one or more communication sessions.

Communication process 10 may reduce 308 a number of participants in a communication session and/or terminate 310 the communication session in order to reduce a load on the communication device. However, reducing 308 the number of participants in an active session and/or terminating the session may be disruptive to participants of the communication session. The score calculated 302 by communication process 10 may help communication process 10 determine which communication sessions should be targeted first for reduction 308 and/or termination 310. For example, reducing 308 the number of participants may be more disruptive for some communication sessions than for others. For example, if a communication session has many participants, it may be disruptive to reduce 308 the number of participants and/or terminate the communication session. If a very important person (VIP), such as a business's CEO, CFO, VP, etc, is participating in a communication session, it may also be disruptive to reduce 308 the number of participants and/or terminate the communication session. Accordingly, in one example, communication process 10 may calculate the score based on the number of participants and/or whether any participants are VIPs.

Communication process 10 may use various factors to calculate 302 the score. For example, communication process 10 may calculate 302 a higher score for a communication session if the communication session has many participants. The more participants, the higher the score communication process 10 may calculate. In one example, each participant may be assigned a value. For example, each participant may have a value of one (1). Communication process may then calculate 302 the score, in part, by adding the values assigned to each participant in a meeting.

Communication process 10 may also calculate 302 the score based, at least in part, on an organizational position of one or more participants in the meeting. For example, if a participant is in the upper tiers of an organizational directory (e.g. the participant is an officer, Vice President (VP), director, etc), then communication process 10 may calculate 302 a higher score for the communication session. In one example, participants in upper tiers of an organizational directory may be assigned a higher value than ordinary participants. For example, a CEO may be assigned a value of one hundred (100); a VP may be assigned a value of seventy five (75), etc. In this case, when communication process 10 calculates 302 a score for the communication session, the score may be weighted by the values assigned to participants in upper tiers of the organizational directory. If a CEO, VP, or other participant in the upper tiers of an organization directory is involved in a communication session, communication process 10 may calculate a much higher score for the communication session. The example above assigns integer values to participants and may add the values together to calculate 302 a score for a communication session. However, this is not meant to be a limitation. One skilled in the art will recognize that other methods of calculating 302 the score and weighting the score for a communication session may be employed. For example, communication process 10 may calculate 302 the score based on the organizational distance between a participant and the highest ranking person in an organization. An organizational distance may be a measurement of how far removed a participant is from the highest ranking person in an organization. For example, assume that a Chief Financial Officer (CFO) directly reports to a CEO, who is the highest ranking person in an organization. The organizational distance between the CFO and CEO may be one (1), because the CFO reports directly to the CEO. Also assume that a vice president reports to the CFO. The organizational distance between the vice president and the CEO may be two (2), because the vice president reports indirectly to the CEO through the CFO. A small distance may indicate that the participant is a senior employee, executive, or manager and may be given a greater weight when calculating 302 the score.

Communication process 10 may dynamically recalculate the score as meeting participants enter and/or leave a communication session. For example, as a VP who is assigned a value of seventy-five (75) enters a communication session, communication process 10 may dynamically recalculate the score of the communication session, taking into account the VP who recently entered and the VP's value of seventy-five. Similarly, as the VP leaves a communication session, communication process 10 may dynamically recalculate the score, taking into account the VP who recently left the communication session and the VP's value of seventy-five. As meeting attendees join a communication session, the score for the communication session may increase. Conversely, as meeting attendees leave a communication session, the score for the communication session may decrease. The examples above describe increasing the score as attendees join a communication session and decreasing the score as attendees leave a communication session. However, one skilled in the art will recognize that this is not intended to be a limitation, as any method of scoring may be used to determine a score of a communication process.

Communication process 10 may associate 304 the score with one or more communication sessions. For example, computer 12 and/or communication server application 22 may provide multiple communication sessions simultaneously. Communication process 10 may calculate 302 a score for each communication session, and may associate 304 the calculated 302 score with each communication session. In this way, communication process 10 may keep track of which communication sessions have which scores. In one example, communication process 10 may store the scores associated 304 with the one or more communication sessions in memory, in a data structure, in a file, in a database, or in any other type of storage. Communication process 10 may update the stored scores dynamically as meeting participants enter and leave the communication sessions by changing the value of the stored scores, for example.

Communication process 10 may also measure 306 a performance metric on the communication device. The performance metric may be indicative of a load on the communication device. As discussed, a communication device (e.g. computer 12) may provide one or more communication sessions. The communication sessions may consume resources on the communication device. As more communication sessions become active on the communication device, the load on the communication device may increase. For example, the communication sessions may use more system resources and may increase the memory or CPU cycles used by the communication device. The communication sessions may also increase other system resources including, but not limited to: network usage, storage device usage, bus bandwidth usage, power consumption, instruction frequency, etc. The communication sessions may also affect the communication device's or the communication session's performance. For example, as the load on the communication device increases, the communication device and/or communication sessions may experience lag, dropped sessions, delayed response times, dropped frames, dropped audio segments, or any other type of performance degradation.

Communication process 10 may measure 306 a performance metric that indicates the level of load on the communication device. For example, communication process 10 may measure a CPU usage metric, a memory usage metric, a network usage metric, a response time, a delay, or any other metric that gauges performance and/or a load on the communication device.

Communication process 10 may then compare the measured 306 performance metric to an acceptable value, an acceptable range, and/or a threshold value. If the performance metric falls outside of the acceptable value (for example, if the performance metric exceeds a maximum threshold, or falls below a minimum threshold), then communication process 10 may reduce 308 the number of participants in the communication sessions. Reducing 308 the number of participants may decrease the load on the communication device so that the performance metric may fall within the acceptable value.

For example, assume that, if the CPU load on a communication device (e.g. computer 12) exceeds 90%, then the communication device will have degraded performance, such as dropped communication sessions, poor quality communication sessions, or complete crashing, and the like. Communication process 10 may measure 306 the CPU load on the communication device and, if the CPU load exceeds 90%, communication process 10 may reduce 308 the number of participants in the communication sessions on the communication device. Reducing 308 the number of participants may include preventing new participants from joining communication sessions and/or preventing new participants from initiating new communication sessions. Communication process 10 may continue to reduce 308 the number of participants until the CPU load falls below 90%. One skilled in the art will recognize that reducing 308 the number of participants may be based on various performance metrics, and is not limited to reducing 308 the number of participants based on a maximum CPU load.

Communication process 10 may reduce 308 the number of participants by terminating 310 one or more communication sessions on the communication device. Communication process 10 may also reduce 308 the number of participants by selectively removing some, but not necessarily all, participants from active communication sessions.

Reducing 308 the number of participants may be based upon the score calculated 302 for the communication session. As discussed above, communication process 10 may calculate 302 a score for the communication sessions. Communication process 10 may then reduce 308 the number of participants in a communication session and/or terminate a communication session based on the score. For example, communication process 10 may reduce 308 the number of participants and/or terminate the communication session with the lowest score first. Communication process 10 may continue reducing 308 the number of participants from the communication sessions with the lowest scores and/or terminating the communication sessions with the lowest scores until the load on the communication device falls within an acceptable value.

Communication session 10 may continuously or periodically measure 306 the performance metric. If the performance metric falls within an acceptable value, communication session 10 may reestablish 312 a terminated communication session. Reestablishing 312 a terminated communication session may include sending a message to one or more participants who were disconnected from the communication session, and allowing the one or more participants to re-join and/or re-initiate the communication session. In one example, communication process 10 may employ a hysteresis when reestablishing 312 terminated communication sessions. For example, communication process 10 may reduce 308 the number of participants when a CPU load exceeds 90%, but may reestablish 312 terminated communication sessions when the CPU load falls below 80%. Reestablishing 312 terminated communication sessions may include communication session 10 redialing and reconnecting the participants of the terminated communication session, and/or sending a message to the participants of the terminated communication session informing the participants that they are free to reestablish their communication session.

Communication process 10 may also reduce 308 the number of participants in communication sessions based on various features and/or measurements. For example, communication process 10 may reduce 308 the number of participants in a communication session based upon the length of time the communication session has been active. In one example, the score 302 calculated by communication process 10 for each communication session may be further based upon the length of time a communication session has been active. Communication process 10 may reduce the number of participants from communication sessions that have been active for a long time. Additionally/alternatively, communication process 10 may reduce 308 the number of participants from communication sessions that have been active for a short time. Communication process 10 may measure the length of time a communication session has been active, and may target the communication sessions for reduction 308 of participants based, at least in part, upon the length of time of the communication sessions. Communication process 10 may also calculate 302 the score for the communication sessions based, at least in part, upon a length of time the communication session has been active.

In another example, communication process 10 may reduce 308 the number of participants in a communication session only if none of the participants in the communication session has a predetermined organizational position. Some participants may be immune from communication process 10 reducing 308 the number of participants and/or terminating a communication session. In one example, communication process 10 may not disconnect the CEO of a company from an active communication session. If the CEO is a participant in a communication session, communication process 10 may not reduce 308 the number of participants in the communication session if reducing 308 the number of participants would result in the CEO or another participant in the CEO's communication session becoming disconnected. In this example, communication process 10 may not disconnect the CEO from the communication session or terminate 310 the CEO's communication session, based on the CEO's organizational position. The organizational position of CEO is used as an example; one skilled in the art will recognize that other organizational positions may also be immune from communication process 10 reducing 308 the number of participants in a communication session.

Communication process 10 may also notify 314 one or more of the participants in the communication sessions before reducing 308 the number of participants. For example, before communication process 10 reduces 308 the number of participants and/or disconnects a participant from a communication session, communication process 10 may display a popup message on the participant's display. The popup message may notify 308 the participant that the participant will be disconnected from the communication session. The popup message may also include other information such as a length of time until the participant is disconnected, and or a reason for the participant becoming disconnected. A typical message may state, "You will be disconnected from the communication session in two minutes due to high server load. Please save all your work." One skilled in the art will recognize that notifying 314 the participant may include any type of message and any type of communication, including, but not limited to: a popup message, a text display, an email, an instant message, a telephone call, an audio recording, etc.

Calculating 302 the score for the communication session may include reading 316 information from an LDAP directory and calculating the score based upon the information from the LDAP directory. As discussed, communication process 10 may calculate 302 the score based on information about one or more participants in the communication session. Communication process 10 may retrieve information about the participants by reading an lightweight directory access protocol (LDAP) directory. An LDAP directory may include information about individuals in a business organization. For example, the LDAP directory may include a communication session participant's name, address, location, organizational position, business unit, keywords associated with the participant, etc. Communication session 10 may use the information from the LDAP directory to calculate 302 the score associated 304 with the communication session.

Calculating 302 the score for the communication session may also include reading 318 information from a social networking directory and calculating the score based upon the information from the social networking directory. A social networking directory may include a graph of users and/or participants connected directly and/or indirectly to each other. In some cases, a social networking directory may include a free-form graph of participants. Where an LDAP may define working relationships between participants, a social networking directory may define a free-form graph of social relationships between participants. A social networking directory may also contain information about a participant, including, but not limited to: name, address, location, telephone number, email address, job title, groups, and the like. Communication process 10 may use the information from the social networking directory including name, address, location, telephone number, email address, job title, groups, and the like, to calculate 302 the score associated 304 with the communication session. For example, participants with a particular name, address, location, telephone number, email address, job title, or group membership may be given different weights, which may affect the calculation 302 of the score, as described above.

Communication process 10 may also include various other features. For example, communication process 10 may warn participants when the measured 306 performance metric is approaching a threshold value. As a performance metric (such as CPU load) approaches an acceptable value (such as 90%), communication process 10 may warn participants by displaying a popup, displaying text, sending an email, sending a voice message, or any other method of warning the participants when the performance metric approaches an acceptable value.

Communication process 10 may also be configured to reserve resources on the communication device for communication sessions. For example, a user may pre-schedule a communication session. If a communication session is pre-scheduled, communication process 10 may ensure that the communication device reserves enough resources to provide services for the communication session for the pre-scheduled time. Additionally/alternatively, a participant in an active communication session or a participant trying to enter an active communication session may request communication process 10 to reserve resources for additional participants. When the resources become available, communication process 10 may inform the additional participants that they may join the active communication sessions and may allow the additional participants to join the communication session.

Additionally/alternatively, a new communication session may request resources upon initiation of the new communication session. Communication process 10 may grant all or some of the resources to the new communication session. For example, a new communication session may require and attempt to reserve resources for 100 participants. However, communication process 10 may only have enough resources for 50 participants. Communication process 10 may create the new communication session with resources for 50 participants, and may inform participants of the new communication system if and when more resources become available. Communication process 10 may also allow additional participants to join the new communication session as the new resources become available.

Communication process 10 may also use presence information to encourage users to form groups. As is known in the art, a presence document may describe a participant's online status and may include the participant's location. Communication process 10 may read a participant's presence information from a presence document to determine whether two or more participants of a communication session are geographically near each other, e.g. in the same building. Communication process 10 may send the participants a message (e.g. text message, email, text display, etc) suggesting the participants join together in a common conference room. Multiple participants joining together in a common conference room may reduce the number of participant connections to the communication session and thus reduce the resources required for the communication session.

If communication process 10 reduces 308 the number of participants in a communication session, communication process 10 may allow a communication session moderator to record the remainder of the communication session so that the content of the communication session is available for any participants disconnected from the communication session.

A number of implementations have been described. Nevertheless, it will be understood that various modifications may be made. Accordingly, other implementations and other uses are within the scope of the following claims.

What is claimed is:

1. A method comprising:
   calculating a score for a communication session on a communication device;
   associating the score with the communication session;
   measuring a performance metric on the communication device, the performance metric indicative of a load on the communication device caused, at least in part, by the communication session; and
   if the performance metric on the communication device falls outside an acceptable value, reducing a number of participants already in the communication session based on the score associated with the communication session, wherein reducing the number of participants includes reducing the number of participants already in the communication session until the performance metric falls within the acceptable value, wherein reducing the number of participants already in the communication session includes terminating the communication session for at least one participant already in the communication session.

2. The method of claim 1 wherein reducing the number of participants in the communication session includes terminating the communication session.

3. The method of claim 2 further comprising reestablishing a terminated communication session if the performance metric on the communication device falls within the acceptable value.

4. The method of claim 1 wherein the score is calculated based, at least in part, upon a total number of participants in the communication session.

5. The method of claim 1 wherein the score is calculated based, at least in part, upon an organizational position of one or more participants in the communication session.

6. The method of claim 1 wherein reducing the number of participants in the communication session is further based, at least in part, upon a length of time the communication session has been active.

7. The method of claim 1 wherein reducing the number of participants in the communication session includes reducing the number of participants only if none of the participants in the communication session has a predetermined organizational position.

8. The method of claim 1 further comprising notifying one or more of the participants in the communication session before reducing the number of participants.

9. The method of claim 1 wherein calculating the score includes one or more of:
   reading information from an LDAP directory and calculating the score based upon the information from the LDAP directory; and
   reading information from a social networking directory and calculating the score based upon the information from the social networking directory.

10. The method of claim 1 wherein the communication session includes at least one of a telephonic communication session, a video communication session, an instant messaging communication session, and an email communication session.

11. A computer program product residing on a computer readable storage device, having a plurality of instructions stored thereon, which, when executed by a processor, cause the processor to perform operations comprising:
    calculating a score for a communication session on a communication device;
    associating the score with the communication session;
    measuring a performance metric on the communication device, the performance metric indicative of a load on the communication device caused, at least in part, by the communication session; and
    if the performance metric on the communication device falls outside an acceptable value, reducing a number of participants already in the communication session based on the score associated with the communication session, wherein reducing the number of participants includes reducing the number of participants already in the communication session until the performance metric falls within the acceptable value, wherein reducing the number of participants already in the communication session includes terminating the communication session for at least one participant already in the communication session.

12. The computer program product of claim 11 wherein reducing the number of participants in the communication session includes terminating the communication session.

13. The computer program product of claim 12 wherein the operations further comprise reestablishing a terminated communication session if the performance metric on the communication device falls within the acceptable value.

14. The computer program product of claim 11 wherein the score is calculated based, at least in part, upon a total number of participants in the communication session.

15. The computer program product of claim 11 wherein the score is calculated based, at least in part, upon an organizational position of one or more participants in the communication session.

16. The computer program product of claim 11 wherein reducing the number of participants in the communication session is further based, at least in part, upon a length of time the communication session has been active.

17. The computer program product of claim 11 wherein reducing the number of participants in the communication session includes reducing the number of participants only if none of the participants in the communication session has a predetermined organizational position.

18. The computer program product of claim 11 wherein the operations further comprise notifying one or more of the participants in the communication session before reducing the number of participants.

19. The computer program product of claim 11 wherein calculating the score includes one or more of:
   reading information from an LDAP directory and calculating the score based upon the information from the LDAP directory; and
   reading information from a social networking directory and calculating the score based upon the information from the social networking directory.

20. The computer program product of claim 11 wherein the communication session includes at least one of a telephonic communication session, a video communication session, an instant messaging communication session, and an email communication session.

* * * * *